July 28, 1964   N. D. LARKY   3,142,835
POSITION INDICATOR
Filed March 18, 1960
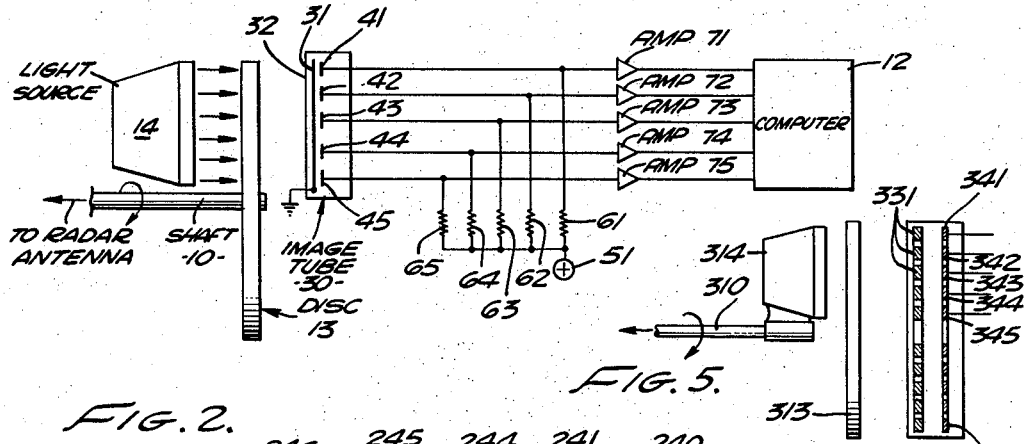
FIG. 1.
FIG. 5.
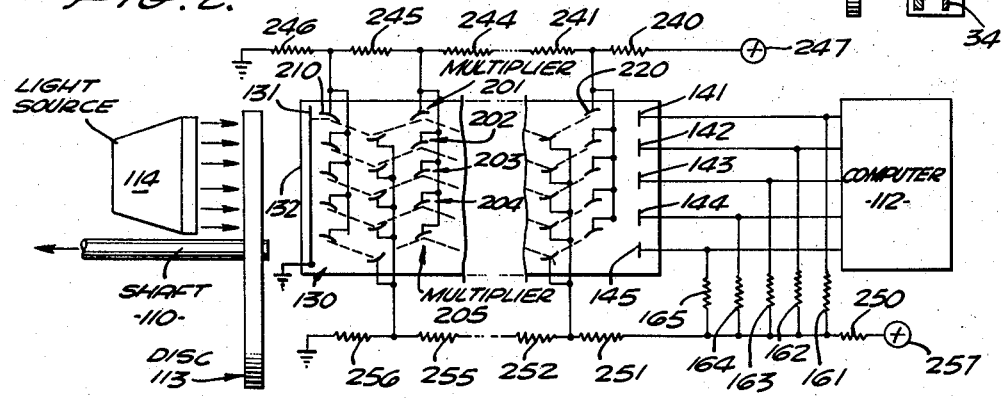
FIG. 2.
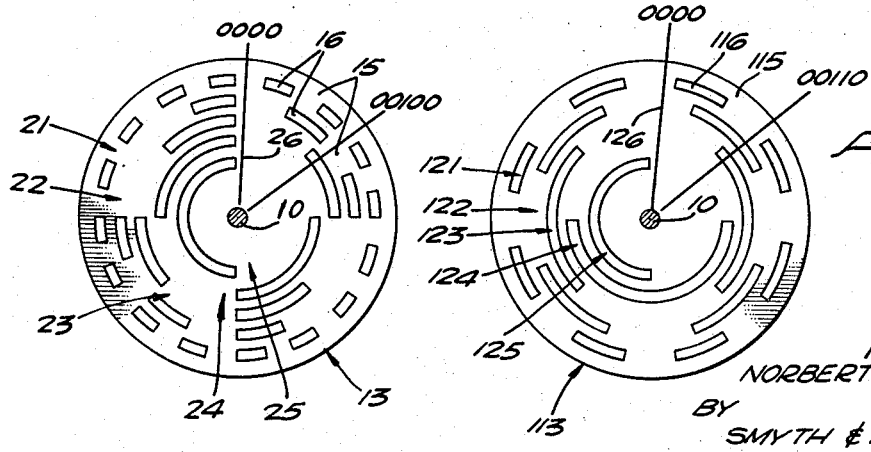
FIG. 3.
FIG. 4.
INVENTOR
NORBERT D. LARKY
BY
SMYTH & ROSTON
David P. Ogden
ATTORNEYS _United States Patent Office_ 3,142,835
Patented July 28, 1964

3,142,835
POSITION INDICATOR
Norbert D. Larky, Venice, Calif., assignor to Space Technology Laboratories, Inc., Los Angeles, Calif., a corporation of Delaware
Filed Mar. 18, 1960, Ser. No. 15,970
2 Claims. (Cl. 340—347)

This invention relates to position indicating apparatus in the form of a converter providing a coded digital output indicative of a shaft position and, more particularly, to such converters utilizing optical code discs.

During the last decade a large number of different apparatus have been developed for converting between analog and digital representations. The applications for these apparatus are numerous and include, illustratively, the interconnection of analog and digital computers, and the provision of direction or bearing information from rotatable equipment such as radar antennas. In the case of analog-to-digital converters, the converters are essentially of two major types according to whether the analog input signal is in the form of a physical position such as a shaft rotation or in the form of an electrical potential. In radar systems where the position of a target is determined from the position of a rotatable radar antenna, the rotating shaft position type converter is most generally used.

In some applications the position input type converter functions at a higher rate of speed than the electrical input converter, with the digital signals being generated by the position input type converter substantially instantaneously. For applications such as the radar system application it is actually the radar antenna axis which is being monitored, so that the position input type converter is particularly suited thereto. In the position input type converter, moreover, the achievable accuracy is greater. Commercially available shaft input converters are available which measure shaft position to one part in 65,536 parts of a revolution (16 binary digits). Voltage input converters have a practical upper limit of accuracy of approximately 0.05 percent (corresponding to 11 binary digits). In radar systems where accuracies of the order of a small part of a degree of rotation are required, the position input type of converter is particularly applicable.

Among position-input converters, some utilize brushes with alternate or coded conducting and insulating segments while others utilize photocells with alternate or coded transparent and opaque segments. Both of these types of position-input converters have disadvantages. For example, the brush type wears out due to friction and the photocell type has photocell-replacement and heat-dissipation problems. In both types of converter a continuous check of the various components must be provided because if one component is inoperative an incorrect conversion results. In the photocell type, if one photocell becomes inoperative due to aging or other factors, the converter appears to be operating satisfactorily but the digital output will be incorrect because of the inoperative photocell. The photocells generally trigger thyratron amplifiers and similarly, if an amplifier is inoperative, the digital output will be incorrect.

In a specific illustrative embodiment of the invention a position-input converter is provided, utilizing an optical code disc having transparent and opaque portions. A linear-source, collimated light beam is directed through the disc to an image tube. The image tube has a single photoemissive translucent surface upon which the light, digitally encoded by the disc, impinges. The tube also includes a number of electron receptors, one for each digit of the coded digital signals, which may be positioned adjacent to the photoemissive surface. The electron receptors are selectively energized by the photoelectrons emitted from the photoemissive surface to provide the digital output.

In the event of the failure of the image tube, an output is not generally provided. Either the converter operates satisfactorily or it does not operate at all. Partial failures and inaccurate digital outputs which are not readily detected are, in this manner, avoided.

Additional features of the invention relate to the provision of a number of electron-multipliers in the image tube, one for each digit of the encoded digital signals. The multipliers direct the electrons to the associated receptors and provide for a considerable signal amplification so that thyratron or other type amplifiers are unnecessary. The digital signal level at the output of the electron-multiplier image tube is adequate for the direct introduction of the digital signals from the tube to utilization equipment such as a computer. The single composite image tube includes essentially all the converter equipment which can provide for inaccuracies. In the event of a tube failure an output digital signal generally is not provided.

Further advantages and features of this invention will become apparent upon consideration of the following description when read in conjunction with the drawing wherein:

FIG. 1 is a functional representation of one embodiment of the position indicating apparatus and converter of this invention;

FIG. 2 is a functional representation of a second embodiment of the position indicating apparatus and converter of this invention wherein the image tube includes electron multipliers;

FIG. 3 is a front view of one coded optical disc that can be utilized in either embodiment of the position indicating apparatus and converter of this invention;

FIG. 4 is a front view of a second coded optical disc that can be utilized in either embodiment of the position indicating apparatus of this invention; and FIG. 5 is a functional representation of a portion of another embodiment.

Referring now to the drawing wherein like numbers indicate identical parts, in FIG. 1 position indicating apparatus in the form of a converter is shown for providing digital signals representing the angular position of a shaft 10 to a computer 12. The shaft 10 may be part of radar equipment (not shown) with the antenna of the radar equipment being supported on or geared to the shaft 10. The radar antenna is rotated with the shaft 10 to scan a region or to track a target (also not shown) so that the angular position of the shaft 10 is indicative of the bearing of the antenna when a target is detected. The shaft 10 supports a coded optical disc 13 which has a number of opaque portions 15 and transparent sections 16 as indicated in FIG. 3. The disc 13 provides a conventional binary digital output representative of the analog input in the form of an angular position of the shaft 10. A collimated light from a light source 14 passes through the openings or transparent sections 16 of the disc 13 which are positioned adjacent thereto to provide the digital output.

As illustrated in FIG. 3, the disc 13 has five concentric code rings 21 through 25 representing, respectively, five binary digits. Having five rings 21 through 25, the disc 13 is capable of indicating the position of the shaft 10 to an accuracy of $\frac{1}{32}$ of a revolution. The present invention, however, is not restricted to any particular number of rings as either more or less can readily be utilized. In each of the rings 21 through 25 of the disc 13, a transparent section 16 represents a binary one (1) digit and an opaque portion represents a binary zero (0) digit.

The rings 21 through 25 are arranged in order with the least significant digit having the largest diameter ring 21 and the most significant digit having the smallest diameter ring 25. The transparent sections 16 in the successive rings 21 through 25 from the least significant to the most significant double in circumferential length from each ring to the next. In other words, the transparent sections 16 of the ring 22 have twice the circumferential length of the transparent sections 16 of the ring 21. Starting with the upper vertical line 26 and moving clockwise through the thirty-two sectors of the disc 13, the binary digital notation provided is as indicated. The gray code or reflected code notation, which is hereinafter described in reference to FIG. 4, is also indicated below:

| Decimal Number | Binary Number | Gray Code |
| --- | --- | --- |
| 0 | 00000 | 00000 |
| 1 | 00001 | 00001 |
| 2 | 00010 | 00011 |
| 3 | 00011 | 00010 |
| 4 | 00100 | 00110 |
| 5 | 00101 | 00111 |
| 6 | 00110 | 00101 |
| 7 | 00111 | 00100 |
| 8 | 01000 | 01100 |
| 9 | 01001 | 01101 |

This system continues according to known principles through stage 31.

The reflected binary or gray code in the right hand column in the above table is utilized to solve the problem of ambiguities at sector boundaries because the code changes by the value of only one digit for successive numbers. The code is developed by reversing the sequence of low order binary digits (that is, reflecting them) and changing the value of the next higher binary digits. The first two numbers (0 and 1) for five digits are 00000 and 00001. For the second and third numbers, the last digits are reversed and the next higher digit is changed from 0 to 1 to result in 00011 and 00010. For the fourth through the sevenths numbers these symbols are repeated, again in inverted sequence, with a 1 in the third position to distinguish them from the first four numbers. The symbols for eight through fifteen and so on are generated in an analogous manner.

The disc 113 in FIG. 4 is coded in accordance with the reflected or binary code and can be utilized in the converter shown in FIG. 1 instead of the disc 13 (FIG. 3). The various parts of the disc 113 have been given reference designations increased by one hundred but otherwise corresponding to the designations of similar components of the disc 13 in FIG. 3. For example, the disc 113 has five code rings 121 through 125 which correspond respectively to the rings 21 through 25 of the disc 13.

The light from the light source 14 is collimated and forms a thin light bar which is radially aligned with respect to the optical disc 13 on the shaft 10. Only a thin radial portion of one sector of the disc 13 is illuminated at any time. The light through the transparent sections 16 of the disc 13 is provided to a number of discrete positions on a photoemissive translucent cathode 31 of an image tube 30. With five rings 21 through 25, a maximum of five discrete positions or areas on the cathode 31 is provided. The cathode 31 is translucent in that electrons are emitted on the side of the cathode 31 opposite to the side which receives the light through the disc 13. The emitted electrons form an electron image of the optical image which has been caused by the light passing through the disc 13 to the cathode 31.

The particular combination of illuminated positions or areas on the cathode 31 is determined by the angular position of the disc 13. The image tube 30 also includes five electron receptors 41 through 45 which are positioned adjacent the five discrete areas on the photoemissive cathode 31. The electrons emitted from each of the areas of the cathode 31 energize one of the five adjacently positioned receptors 41 through 45.

As illustrated in FIGS. 3 and 4, the code rings 21 through 25 and 121 through 125 are separated somewhat from each other so that illuminated areas on the cathode 31 are not contiguous. The electron receptors 41 through 45 may be spaced by distances equal to the separating distance of the code rings and each of the receptors 41 through 45 may have a square shape with the side of the square shape having a length equal to the width of one of the code rings. The cathode 31 may be rectangularly shaped having a length approximately equal to the radius of the disc 13 and a width equal to the width of one of the collimated light bars.

Positive potential is provided respectively to the five electron receptors 41 through 45 by a battery 51 connected respectively through five resistors 61 through 65 to the electron receptors 41 through 45. Responsive to the illumination at any one of the five areas of the rectangularly shaped photoemissive cathode 31, a potential is developed across the associated one of the resistors 61 through 65. In this manner potentials are selectively developed across the resistors 61 through 65 in accordance with the angular position of the disc 13. The resistors 61 through 65 are connected respectively to the inputs of five amplifiers 71 through 75 which may be trigger circuits responsive respectively to the potentials developed by the image tube 30 across the resistors 61 through 65. The amplified pulses from the amplifiers 71 through 75 are introduced to a digital computer 12 or other digital utilization apparatus.

In the event of the failure of the tube 30, as might happen because of a gaseous leak, signals are not provided therefrom so that none of the amplifiers 71 through 75 are operative to provide digital signals to the computer 12. Accordingly no output, as distinguished from an incorrect output, is provided should there be a failure of the photoresponsive portion of the converter.

In the embodiment shown in FIG. 1, a separate amplifier is provided for each of the five digits of the digital code signals. In FIG. 2 such amplifiers are not required. The various components in FIG. 2, which are similar to corresponding components of FIG. 1, have been given similar reference designations with the addition of 100. For example, the light source 114 in FIG. 2 is similar to the light source 14 in FIG. 1.

The image tube 130 in FIG. 2 includes the translucent photoemissive cathode 131 and the five electron receptors 141 through 145. The electron image on the cathode 131, however, is provided through five secondary emission type electron multipliers 201 through 205 to the receptors 141 through 145. Each of the five areas which can be illuminated on the translucent photoemissive cathode 131 is electrically coupled by one of the five multipliers 201 through 205 to its associated one of the receptors 141 through 145.

The multipliers 201 through 205 function to both steer the electrons from the areas on the cathode 131 to the associated receptors 141 through 145 and to materially amplify the amount of electrons impinging on the receptors 141 through 145. Each of the multipliers 201 through 205 includes a number of secondary emission anodes. Illustratively, eleven anodes 210 through 220 may be included as part of each of the multipliers 201 through 205. Each of the anodes 210 through 220 is coated with a secondary emissive layer of material designed to provide six or seven electrons emitted for each electron impinging thereon. The anodes 210 through 220 are at successively more positive potentials so that the secondary electrons emitted by one of the anodes are attracted to the next anode in the multiplier. Desired anode potentials are provided to the anodes 210 through 220 by voltage divider arrangements illustratively including seven resistors 240 through 246 in one serial arrangement and seven resistors 250 through 256 in another serial arrangement. The serial arrangement of resistors 240 through 246 is coupled between a first positive potential source 247 and a ground connection. The junctions between the resistors 240 through 246 are connected respectively to the even numbered anodes in each of the multipliers 201 through 205. The junctions are, accordingly, connected to every other anode in each multiplier.

The alternate anodes are energized through the other voltage divider arrangement consisting of the resistors 250 through 256 which is connected between a second positive potential source 257 and a ground connection. The receptors 141 through 145 are coupled respectively to the junction of the resistors 250 and 251 by the five resistors 161 through 165. The magnitude of the potential provided from the second positive potential source 257 is selected so that the potential at the receptors 141 through 145 are more positive than at the adjacent anode 220. Due to the two voltage divider arrangements, the successive anodes of each of the multipliers 201 through 205 are more positive from the cathode 131 to the receptors 141 through 145. The voltage dividers may also be included as part of the tube 130 and plating or printed circuit techniques may be utilized to provide them in substantially two-dimensional form. If desired, the resistors 161 through 165 may also be included as part of the tube 130.

The output provided at the electron receptors 141 through 145 is considerably amplified by the secondary emission multipliers 201 through 205 so that further amplification is not required for the computer 112. The binary digit coded signals from the electron receptors 141 through 145 may, in this manner be provided directly to the computer 112.

In the event of a failure of the image tube 130, such as due to a gaseous leak, an output is not provided to the computer 112. In operability of either the photoresponsive or amplifier components of the converter provides for no output at all instead of for an incorrect output; at least to this extent the invention results in a "fail-safe" indication.

In addition to the above described provision of a linear light source it is contemplated that the photoemissive surface cathode 31 (FIG. 1) or 131 (FIG. 2) could itself be linear or could be shielded by a mask having a linear slot on the surface 32 or 132 respectively. Similarly, the photoemissive cathode can be arranged as discrete elements positioned to receive luminescent information from the coding system. On the other hand the receptor, rather than the light source or the photoemissive cathode, may be linear. Moreover, as indicated in FIG. 5, a collimated light source 314 is rotatably mounted on a shaft 310 in front of a coded disc 313 so that when light passes from the source 314 through the disc 313 it impinges upon one or another of the annular photoemissive cathodes 331 to selectively energize the annular receptors 341 through 345. When rotating the collimated light source 314 instead of the disc 313, the other operations of the system are substantially the same as those discussed in connection with FIG. 1.

Further modifications of the present invention are also possible without departure from the true spirit and scope of this invention. For instance, the coding of the disc 313 may be placed directly on the photoemissive surfaces to the extent that the photoemissive cathode 331 (FIG. 5) is discretely arranged as a coded circumferential array of the type indicated in connection with FIG. 3. Furthermore, when this modification is used the light source 314 need not be collimated. Instead, the disc 313 is rotatable (as in FIGS. 1 and 2) and has a single radial slot therein whereby the light is made linear by the disc rather than the source.

Although this invention has been disclosed and illustrated with reference to particular embodiments, the principles involved are susceptible of numerous other modifications which will be apparent to persons skilled in the art. For instance, the embodiments discussed in connection with FIG. 5 could include electron multipliers as illustrated in FIG. 2. The invention is, therefore, to be limited only as indicated by the scope of the appended claims.

I claim:

1. An analog-to-digital converter, including: a rotatable optical disc having a plurality of concentric code rings representing the digits of a number; a stationary light source for providing light along a thin radial area of said disc across each of said rings, each of said code rings having a number of alternate sections transparent and opaque respectively to the light from said source so that as said disc rotates different combinations of transparent and opaque sections are lined up in the thin radial area of light; a stationary photoemissive vacuum tube positioned adjacent said disc along the path of the light from said source so that the light along said thin radial area which passes through a transparent section of any one of the code rings enters said tube, said tube including a translucent photoemissive cathode having an electron emissive surface at least as large circumferentially as said then radial area illuminated by the light from said source; and an electron receptor for each of said code rings positioned adjacent said electron emissive surface for receiving the electrons emitted from the portion of said surface adjacent thereto, said electron receptors being arranged in a row parallel to said thin radial area so that said receptors are selectively energized in accordance with the coding determined by the transparent sections of said rings along said thin radial area illuminated by the light from said source.

2. An analog-to digital converter, including: a rotatable optical disc having a plurality of concentric code rings representing the digits of a number; a stationary light source for providing light along a radial area of said disc across each of said rings, each of said code rings having a number of alternate sections transparent and opaque respectively to the light from said source so that as said disc rotates different combinations of transparent and opaque sections are lined up in the radial area of light; a stationary photoemissive vacuum tube positioned adjacent said disc along the path of the light from said source so that the light along said radial area which passes through a transparent section of any one of the code rings enters said tube, said tube including a thin radial translucent photoemissive cathode having an electron emissive surface defining a thin radial area illuminated by the light from said source; and an electron receptor for each of said code rings positioned adjacent said electron emissive surface for receiving the electrons emitted from the portion of said surface adjacent thereto, said electron receptors being arranged in a row parallel to said thin radial area so that said receptors are selectively energized in accordance with the coding determined by the transparent sections of said rings along said thin radial area illuminated by the light from said source.

References Cited in the file of this patent

UNITED STATES PATENTS

| | | |
|---|---|---|
| 2,632,058 | Gray | Mar. 17, 1953 |
| 2,667,599 | Rajchman | Jan. 26, 1954 |
| 2,714,204 | Lippel | July 26, 1955 |
| 2,754,428 | Franks et al. | July 10, 1956 |
| 2,836,755 | Sommer | May 27, 1958 |
| 2,895,068 | Rodda | July 14, 1959 |
| 2,966,671 | Abbott et al. | Dec. 27, 1960 |
| 3,020,534 | Jones | Feb. 6, 1962 |